United States Patent

Swinbanks

Patent Number: 6,127,757
Date of Patent: Oct. 3, 2000

[54] LEVITATION DEVICE

[75] Inventor: Malcolm A Swinbanks, Cambridge, United Kingdom

[73] Assignee: Bae Systems Electronics Limited, United Kingdom

[21] Appl. No.: 08/804,349

[22] Filed: Mar. 6, 1997

[30] Foreign Application Priority Data

Mar. 8, 1996 [GB] United Kingdom ............... 9604952

[51] Int. Cl.$^7$ ............... H02K 7/09; H02K 5/24; B60L 13/00; F16M 7/00
[52] U.S. Cl. ............ 310/90.5; 104/293; 248/636; 248/638; 310/51
[58] Field of Search ................... 188/378, 380, 188/267; 104/290, 293; 248/550, 562, 636, 638; 114/269, 271; 440/111, 113; 318/114, 115, 128, 135; 310/51, 90.5

[56] References Cited

U.S. PATENT DOCUMENTS

| | | | |
|---|---|---|---|
| 4,624,435 | 11/1986 | Freudenberg | 248/550 |
| 5,011,108 | 4/1991 | Chen et al. | 248/550 |
| 5,387,851 | 2/1995 | Nuscheler et al. | 318/135 |
| 5,609,230 | 3/1997 | Swinbanks | 188/267 |
| 5,631,617 | 5/1997 | Morishita | 310/90.5 X |

FOREIGN PATENT DOCUMENTS

| | | | |
|---|---|---|---|
| 2221743 | 2/1990 | United Kingdom | 248/638 |
| 2259158 | 3/1993 | United Kingdom | 318/135 |

*Primary Examiner*—Harold J. Tudor
*Assistant Examiner*—Matthew J. Lattig
*Attorney, Agent, or Firm*—Kirschstein, et al.

[57] ABSTRACT

An electromagnetic levitation device comprises an electromagnet (12) which is supported by a structure (13) and is arranged to attract armature (10) carried by another structure (11). Current to the electromagnet (12) is regulated by a control device (16) to ensure that the electromagnetic force exerted by the electromagnet (12) on the armature (10) is sufficient to cause and maintain levitation of the structures (11, 13) at a desired spacing (A in FIG. 1). A decoupling device (17) is arranged between the armature (10) and the structure (11) to accommodate a shock load (L) which reduces the flux gap (15) to zero and decouples the armature (10) from its support structure (11) by moving the stop (20) away from the structure (11). This significantly increases the extent of shock loading that can be tolerated before damage will be incurred.

7 Claims, 1 Drawing Sheet

LEVITATION DEVICE

BACKGROUND OF THE INVENTION

This invention relates to an electromagnetic levitation device for causing relative levitation of first and second structure.

Such electromagnetic levitation devices have many uses in which one structure is inherently supported from another structure by an electromagnetic flux typically between an electromagnet and an associated armature. Whilst the electromagnet can be used to repel the armature, the present invention is particularly concerned with levitation devices in which the armature is attracted by the electromagnet. With such an arrangement the control of the current to the electromagnet is particularly critical when it is desired to retain the flux gap between the electromagnetic and its armature. Our co-pending British Patent Application No. 9604429.2 (GEC Case file P/60857/MRC) filed on Mar. 1, 1996 teaches how the electromagnetic force can be controlled by a control device which regulates the current to the electromagnet. The whole contents of that application are incorporated herein by reference.

In our co-pending British Patent Application No. 9604973.9 (GEC Case file P/60855/MRC) we have taught how a structure carrying machinery can be levitated within the hull of a vessel, using the electromagnetic attraction between an electromagnet and an armature, whilst keeping the flux gap open to inhibit the transmission of noise from the machinery to the hull, to inhibit the transmission of shock from the hull to the machinery, and to accommodate expansion and contraction of the hull by external hydraulic forces. The whole contents of that application are also incorporated herein by reference.

When two structures are inter-connected by an electromagnetic levitation device to achieve relative levitation using the attraction of an armature to an electromagnet, the flux gap can be controlled by the control device taught by our aforesaid co-pending patent application. However, if a significant shock is suddenly applied to one of the structures, this can close the flux gap with a consequence that the electromagnet and armature can suddenly impact with the danger of consequential damage.

SUMMARY OF THE INVENTION

It is an object of the present invention to provide an electromagnetic levitation device which will accommodate such sudden shocks without causing impact damage between its electromagnet and its armature. This is particularly useful when a massive support structure carrying heavy machinery is levitated within the hull of a vessel, such as a submarine, and need to be protected from the application of large shocks to the hull caused by external detonations from depth charges or other ordinance. However, the invention is also of general use to prevent impact damage caused by the application of significant shocks to other structures employing electromagnetic levitation.

According to the invention an electromagnetic levitation device comprises an armature portion supported by a first structure, an electromagnet portion supported by a second structure, a flux gap defined between the armature portion and the electromagnet portion, a control device to regulate the current to the electromagnet portion to attract the armature portion towards the electromagnet portion with a force sufficient to cause and maintain levitation of one structure relative to the other structure at a desired spacing which will maintain the flux gap to ensure physical separation between the armature portion and the electromagnet portion, and one of the portions is mounted from its support structure by a decoupling device arranged to inhibit the transmission of shock between the portions whenever the spacing of the structures is reduced to a value which would result in physical contact between the portions.

The said one portion is preferably mounted from its support structure by a slidable coupling arranged to permit limited movement of the said one portion towards its support structure, and a stop is arranged to limit movement of the said one portion towards the other said one portion and to transmit the force between the said one portion and its support structure. A bias device may be arranged to react between the said one portion and its support structure to bias the said one portion towards the other said portion.

Preferably a buffer is arranged between said one portion and its support structure and a separate buffer between the stop and the support structure for said one portion.

Although the armature portion and electromagnet portion may be interchanged, we prefer the said one portion to be the armature portion. That is that the armature portion is mounted from its support structure by the decoupling device.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
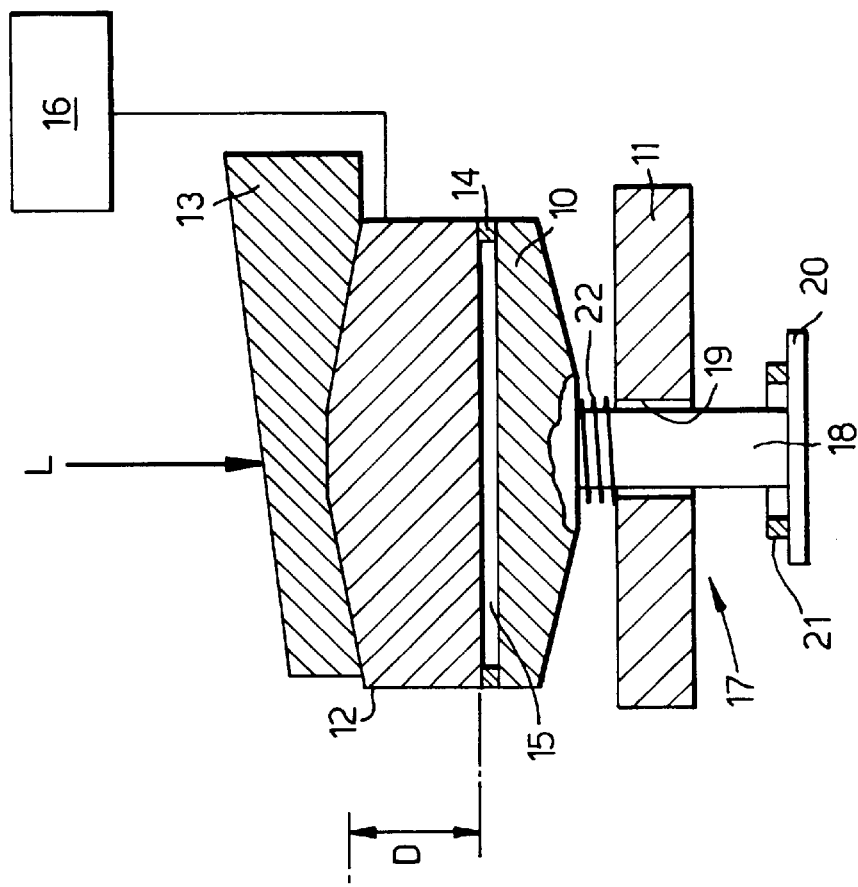
FIG. 1 is a transverse section through an electromagnetic levitation device shown in its normal operational position.

With reference to FIG. 1, an electromagnetic levitation device comprises an armature 10 supported by a first structure 11, and an electromagnet 12 supported by a second structure 13. A buffer 14, conveniently formed from an appropriate grade of synthetic rubber, is carried by the electromagnet 12 and prevents direct physical contact between the armature 10 and the electromagnet 12. Although the electromagnet 12 is arranged to attract the armature 10, a flux gap 15 is normally maintained between them by a control device 16 which regulates the current to the electromagnet 12. The regulation achieved by the control device 16 ensures that the electromagnetic force exerted by the electromagnet 12 on the armature 10 is sufficient to cause and maintain relative levitation of the structures 11 and 13 at a desired spacing indicated by arrow a. The control device 16 is arranged to operate as taught in our aforesaid co-pending British Patent Application No. 9604429.2 (GEC Case File P/60857/MRC) and maintains the spacing a irrespective of normal variations in the force necessary to maintain the relative levitation of the structures 11 and 13.

However, if a significant shock load is suddenly applied between the structures 11 and 13, the flux gap 15 will be reduced to the point at which the buffer 14 engages the surface of the armature 10 and there is a very significant risk of the impact causing significant damage to the armature 10, or more probably to the electromagnet 12. In the event of a very severe shock there is also the possibility that one or other of the structures 11, 13 may be distorted or otherwise damaged.

In order to accommodate shocks, the present invention provides a decoupling device 17 between the armature 10 and the first structure 11. The decoupling device 17 comprises a generally cylindrical pillar 18 which is rigidly secured to the armature 10 and passes, with working clearance, through a corresponding aperture 19 in the structure 11. The end of the pillar 18 remote from armature 10 is provided with a stop 20. In this manner the pillar 18 and aperture 19 constitute a slidable coupling which is arranged to permit limited movement of the armature 10 towards the support structure 11. On the other hand, the stop 20 is arranged to engage the first structure 11 through a buffer 21, which can be made of a similar material to the buffer 14. In this manner the stop 20 serves to transmit the levitation force from the armature 10 to the structure 11.

A coil spring 22 is arranged around the pillar 18 to react between the armature 10 and the structure 11, thereby constituting a bias device to bias the armature 10 towards the electromagnet 12.

During normal operation the flux gap 15 will be as shown in FIG. 1 and the stop 20 will bear against the structure 11 via the buffer 21, the control device 16 regulating the electromagnet 12 to exert the levitational force which will maintain the spacing A.

Figure 2:
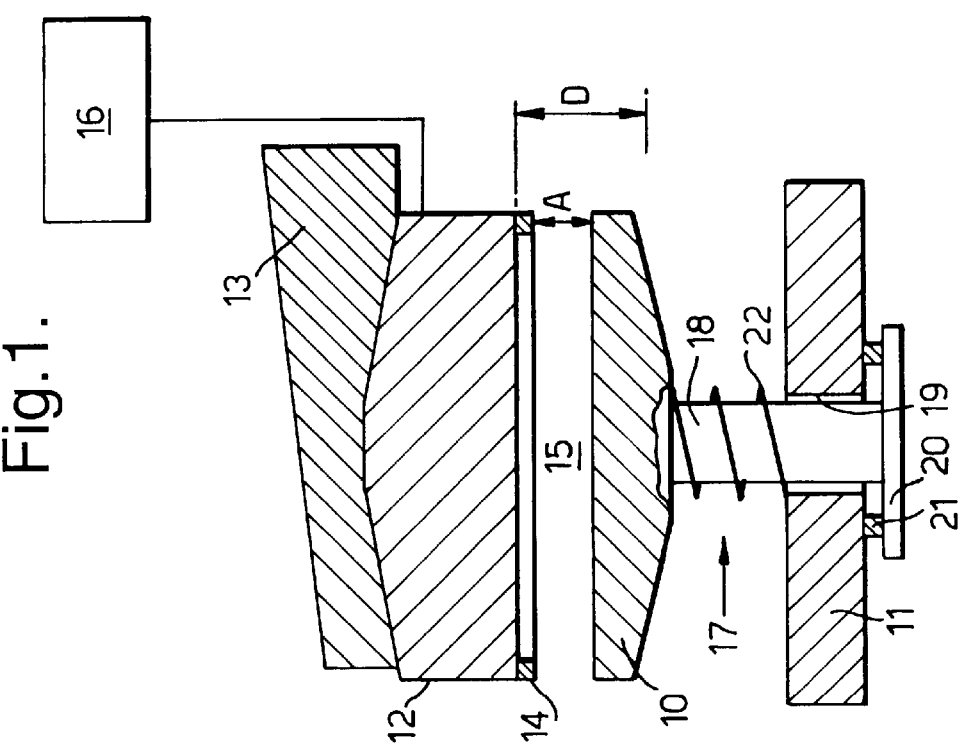
FIG. 2 shows the arrangement of FIG. 1 after subjection to a significant shock load.

As shown in FIG. 2, when a significant shock load L is applied to the structure 13, the flux gap 15 can be reduced to the point at which spacing a becomes zero and continued movement of the structure 13 relatively towards the structure 11, operates the decoupling device 17 as shown. Thus the slidable coupling 18, 19 permits the armature 10 to be decoupled from its support structure 11 because the stop 20 is moved away from the structure 11. As shown, this enables the shock load L to increase the relative displacement between the structures 11 and 13 from A to D, thereby significantly increasing the extend of shock loading L that can be tolerated before any damage will be caused to the armature 10, or the electromagnet 12, or their respective support structures 11 and 13.

As the shock load L decreases, the spring 22 will move the armature 10 until its stop 10 again engages the structure 11 via the buffer 21, thereby recoupling the armature 10 to the structure 11.

Although the decoupling device 17 has been shown as being operative between the armature 10 and its support structure 11, it could be arranged instead between the electromagnet 12 and its support structure 13.

The pillar 18 may have a much greater diameter than shown in order to increase its bearing area with the aperture 19. In this event the pillar 18 would be formed hollow to avoid unnecessary weight.

In a typical application the levitation devices illustrated would form part of a levitation system for supporting a structure weighing about 500 tons. The spacing A in this case would typically be half an inch and the spacing D would be between 3 and 4 inches.

If desired, the stop 20 can be adjustably mounted on the pillar 18 to regulate the maximum displacement and/or to facilitate mounting of the armature 10 to the structure 11. Furthermore, such adjustability can be used to retain the armature 10 in the position shown in FIG. 2 whilst the levitation device is being installed.

What is claimed is:

1. An electromagnetic levitation device comprising an armature portion supported by a first structure, an electromagnet portion supported by a second structure, a flux gap defined between the armature portion and the electromagnet portion, a control device to regulate the current to the electromagnet portion to attract the armature portion towards the electromagnet portion with a force sufficient to cause and maintain levitation of one structure relative to the other structure at a desired spacing which will maintain the flux gap to ensure physical separation between the armature portion and the electromagnet portion, and one of the portions is mounted from its support structure by a decoupling device arranged to inhibit the transmission of shock between the portions whenever the spacing of the structures is reduced to a value which would result in physical contact between the portions.

2. An electromagnetic levitation device, according to claim 1, in which the said one portion is mounted from its support structure by a slidable coupling arranged to permit limited movement of the said one portion towards its support structure, and a stop is arranged to limit movement of the said one portion towards the other said one portion and to transmit the force between the said one portion and its support structure.

3. An electromagnetic levitation device, according to claim 2, including a bias device arranged to react between the said one portion and its support structure to bias the said one portion towards the other said portion.

4. An electromagnetic levitation device, according to claim 2, including a buffer between said one portion and its support structure.

5. An electromagnetic levitation device, according to claim 2 including a buffer between the stop and the support structure for said one portion.

6. An electromagnetic levitation device according to claim 1 in which the said one portion is the armature portion.

7. Apparatus comprising first and second structures mounted for relative levitation by at least one electromagnetic levitation device in accordance with claim 1.

* * * * *